March 14, 1939.  F. J. MAYWALD ET AL  2,150,178
SPONGE RUBBER AND PROCESS OF MAKING SAME
Filed May 4, 1936
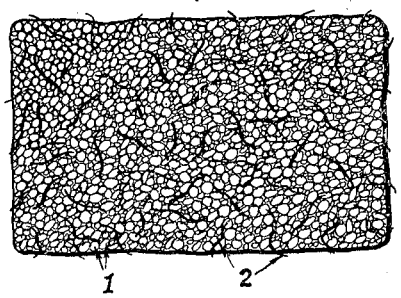
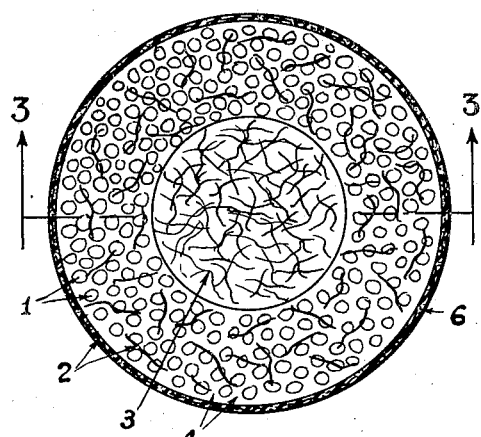
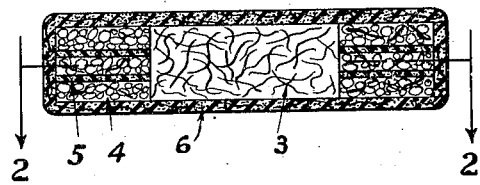
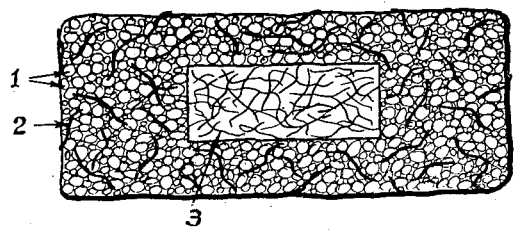
Inventors
Frederick J. Maywald and
Frederick J. Maywald, Jr.
By Roderick Malcolm
Attorney

UNITED STATES PATENT OFFICE 2,150,178

SPONGE RUBBER AND PROCESS OF MAKING SAME

Frederick J. Maywald and Frederick J. Maywald, Jr., Rutherford, N. J.

Application May 4, 1936, Serial No. 77,809

12 Claims. (Cl. 18—53)

This case is a continuation in part of, and is substituted for, application Serial No. 671,356, filed May 16, 1933.

This invention relates to sponge rubber and a process of making same.

An object of the invention is to provide a sponge rubber having large absorption and carrying power for liquids, such as water, and which will float thereon.

Another object is to provide a sponge rubber having a small density, and great tensile strength, and which will not easily tear in use.

Another object of the invention is to prepare a sponge rubber which does not "sour" and which has the color and feel of natural sponge.

Another object is to provide an absorbent sponge rubber having small communicating pores of uniform size.

Another object is to provide a fiber-sponge rubber which is substantially free from clots.

A still further object of the invention is to provide a process for making absorbent sponge rubber without rupturing or mechanically exploding the cells and vesicles therein.

It is known to add flox to rubber compounds as a filler. Flox is obtained by grinding the waste screenings from wool, cotton, silk, rayon, and other fibers in their purification, and also from the wastes obtained in the production of shoddies. Such flox is composed of very short fibers, of 3/16" (5 mm.) or less in length.

If fibers of spinnable length, i. e., substantially longer than 3/16", are added to ordinary rubber stock on the mill, the fiber will clot or felt into lumps, and it is practically impossible to free the stock from such lumps. Continued milling to remove such lumps causes the fibers to be ground to a powder which becomes substantially ordinary flox filler.

We have now discovered that improved sponge rubber having hitherto unknown properties may be prepared by incorporating an oily body and fibers of silk, wool, cotton, flax, hemp, jute, ramie, rayon, etc., or mixtures of the same of substantially greater length than 3/16" into rubber compound and curing and blowing the same. The oily body may be a liquid or semi-liquid oil such as paraffin oil, mineral oil, cottonseed oil, corn oil, palm oil, wool grease, liquid halowax, resinous bodies, oleic acid, etc. The oily body is added in amount in excess of the usual compounding amounts as softeners, etc., and appears to lubricate the fibers and prevent clotting or felting, and also prevent the fibers from being ground. Generally the amount of oily body used varies according to the nature of the product required, the type of rubber and compounding materials employed, the curing temperature, and the amount of fiber used. Thereby, the oily fibers disperse evenly through the compound during milling.

Preferred results are obtained with wool fibers, either scoured or unscoured. Preferably scoured wool fibers are used as they do not discolor the product, and give a better product than the unscoured wool. As little as 2% on the rubber of fiber gives a binding action and ties down the stock, but it requires at least 5% on the rubber to increase the water absorption over that of ordinary sponge rubber. As high as 75% on the rubber may be used; a greater fiber content tends to give an unsatisfactory commercial article.

We have obtained good results with the following formula:

| | Parts |
|---|---|
| Rubber | 400 |
| Oil | 100 |
| Antioxidant | 5 |
| Accelerator | 2 |
| Zinc oxide | 20 |
| Blowing agent | 40 |
| Sulphur | 7 |
| Wool or other fibers of spinnable length and texture | 150 |

We have also obtained good results with the following formula:

| | Parts |
|---|---|
| Rubber | 400 |
| Vaseline | 50 |
| Antioxidant | 6 |
| Accelerator | 1 |
| Zinc oxide | 20 |
| Blowing agent | 40 |
| Sulphur | 17 |
| Oleic acid | 50 |
| Wool or other fibers of spinnable length and texture | 100 |

The antioxidant we prefer using is preferably one of the amino-aldehyde compounds, for instance, phenyl-alpha-napthylamine, (known in the trade as "Neozone").

The accelerator may be of any suitable or convenient type. We have obtained good results with diphenylguanidine ("DPG"), and also with thiuram mono sulphide, ("Thionex").

The rubber is first thoroughly broken down and the antioxidant, accelerator, zinc oxide and sulphur added. After thoroughly mixing, the fiber is gradually added to the stock in small amounts, while the oily body is poured over the fiber. With such procedure, the fiber does not clot or felt, but freely enters into the compound without being broken down into shorter lengths. After all of the fibers and oily body have been added, the stock is milled for a short time to effect thorough incorporation, refined, and the blowing agent is added. Any milling machine including the regulation rubber mill with odd speed rolls, and the Banbury mill, which has no rolls, may be used. The rubber stock is then cured in any well-known manner, as at 310° F. for eight minutes.

To obtain a softer sponge of higher water absorbing power, the rubber stock may be semi-cured by heating at 280° F. for 20 to 30 minutes, and suitable forms such as disks and the like may be punched out of the semi-cured rubber. The disks are then placed upon each other, preferably with a thin sheet of uncured rubber stock between each disk as a cementing agent, the disks covered with an outer layer of uncured rubber stock, and the whole mass is then completely cured on a suitable container of wire, cloth, etc.

Instead of disks, hollow forms such as rings, washers, etc., may be punched from the semi-cured rubber. Rings having a 3" outer diameter and a 1½" hole were cemented with uncured rubber stock and the inner hollow portion filled with an absorbent material such as loose wool. The whole mass was covered with uncured rubber stock and completely cured. To prevent separation of the disks during curing, they may be held in position by means of threads run through the disks in any desired manner.

In the drawing, Fig. 1 is an elevational view of a fiber-rubber sponge,

Fig. 2 is a horizontal sectional view of the sponge during its manufacture, taken on the line 2—2 of Fig. 3, Fig. 3 is a vertical sectional view of the sponge during its manufacture, taken on the line 3—3 of Fig. 2, and Fig. 4 is a vertical sectional view of the finished sponge.

The pores, vesicles, or hollow spaces in the rubber are designated 1. The flocculent or pliable organic fibers are 2; they are mixed in all and random directions throughout the mass. 3 is the wool or other absorbent fiber beneath the surface of the sponge, and 4 is layers of semi-cured rubber separated by intermediate layers of uncured rubber 5. 6 is a surrounding layer of preferably uncured rubber.

The rubber products may be soft, semi-soft, or semi-hard. The hardness of the product may be increased by increasing the amount of sulphur used or by substituting silk, cotton, rayon, ramie, flax, hemp, jute, etc., in place of the wool mentioned in the formula. The harder sponge products may be used as buffing, cleaning, and polishing agents and the semi-soft products are usable as insoles, outsoles, and heels for shoes, particularly for sport and hospital wear.

Any well-known blowing agent may be used, such as sodium bicarbonate, ammonium carbonate, etc. The particular blowing agent to be used will depend somewhat on the type and kind of sponge desired, and the nature and amount of oily body, accelerator, and antioxidant may be varied according to common practice. The antioxidant and/or accelerator may be omitted, but modern rubber practice indicates the use of both. If desired, the fibers can be oiled before milling in, and allowance made for this by decreasing the amount of oil milled in.

We have further discovered that as little as 0.01% of organic compounds such as aldehydes, aldehyde amines, aldehyde esters and salts, ketones and alcohols act as "levelers" in the blowing process, causing decided increase in the size of the sponge, uniformity of blowing, increased tensile strength and better feel of the finished product. In such use, aldehydes of $C_9$, $C_{10}$, $C_{13}$ up to $C_{18}$, cinnamic aldehyde, and other aldehydes, and corresponding alcohols, ketones, and the like give very good results.

Ordinary fibers, when exposed to dry heat of 250° F. and above will char or deteriorate, but in the present process, curing temperatures of higher than 310° F. may be used without injuring or breaking down the fibers.

Unlike plain sponge rubber stock, our stock, even with its excess of oily body, has very little flow on the mill or in the cure, and it is not necessary to confine our stock to determine its shape or the size of the pores. The fiberized stock can be cut to the desired shape, and laid on shelves of cloth, wire, or other suitable carrier, without confining the stock in any way, and cured in dry heat, a press, open steam, etc. The stock rises to a predetermined height with little or no side expansion.

Apparently the rubber enters into the pores of the fiber and becomes anchored and combined, and not only imparts additional strength to the product, but gives a distinct and readily recognizable feel to the hand. Our product has small communicating pores of uniform size, and does not have to be broken down after manufacture. Ordinary sponge rubber has impervious cell walls, and unless broken down, the sponge will not absorb or carry a great amount of water. Ordinary sponge rubber causes friction when rubbed over the skin, whereas our product does not cause such friction but has a soft, silky feel. Our product has additional cleaning properties as compared with natural or rubber sponges, which is of particular advantage in the cleaning of automobiles, glass, and other articles.

The fibers, according to the present invention, act as binding agents and tie the stock down so that it has smaller and more uniform holes, the resulting sponge also being tougher, lighter, and having greater tensile strength and resistance to tearing than either natural sponge or sponge rubber. Our product does not feel like ordinary sponge rubber, but has the color and feel of natural sponge, and has little or no tendency to "souring" as is usual with natural sponge and ordinary rubber sponge.

Our fiberized sponge rubber, when tested by the ordinary means for determining the liquid-carrying capacity, will retain and carry a greater quantity of liquid than a rubber sponge of approximately the same texture. The liquid-carrying properties of our product may be varied by the amount, length, and kind of fiber used, an increasing amount and longer length giving greater liquid-carrying properties.

We are aware, as evidenced by U. S. P. No. 1,884,106 to Edward J. Moran, issued October 25, 1932, that it has previously been proposed to incorporate hog-bristles into sponge rubber stock by passing the rubber and bristles between parallel rolls whereby the coarse hair or bristles assume a general parallelism one with another and the finished product has very little elasticity or stretch in the direction of the disposal of the hair. As previously set forth, the process of our invention ensures a random distribution of the fibers so that the product of our invention is characterized by a degree of uniformity in elasticity and stretch not found in fiber-reinforced rubber products wherein the fibers are disposed in general parallelism.

It is of course evident that the hog-bristles of the Moran patent are in their very nature, non-absorbent, unpliable, coarse, and brittle and that such "fibers" will fracture and break when subject to strain, so that the compound is entirely unsuited for use in footwear or for other use involving more or less constant flexing.

We are not to be limited to any specific formula of reacting materials, accelerator, antioxidant, etc., nor to any method of compounding, curing, or blowing, but intend to claim broadly our process and product in the appended claims.

We claim:

1. Process of making fiber reinforced sponge rubber which comprises subjecting fibers to an oily body of a type and quantity capable of rendering the fibers slippery, mixing the slippery fibers into rubber, adding a blowing agent and curing.

2. The invention as set forth in claim 1 and wherein said oily body comprises a relatively heavy mineral oil.

3. The invention as set forth in claim 1 wherein a leveler comprising an aldehyde amine is mixed with the rubber.

4. Process of making fiber reinforced sponge rubber which comprises breaking down rubber on a mill, adding fibers of spinnable length and texture to the rubber on the mill in the presence of a lubricant of a type and quantity capable of rendering the fibers slippery, milling the batch to cause the slippery fibers to be distributed substantially unbroken throughout the rubber, adding a blowing agent, and curing.

5. The invention as set forth in claim 4 and wherein the fibers are rendered slippery prior to being added to the rubber.

6. The invention as set forth in claim 4 and wherein the rubber and slippery fibers are subjected to rollers moving at unequal speeds during the milling operation.

7. The invention as set forth in claim 4 and wherein at least 5% of fibers are added to the rubber.

8. A sponge rubber compound having fibers of spinnable length and texture incorporated therein, said compound being characterized by containing the fibers evenly distributed in all and random directions throughout the cellular structure of the sponge-rubber.

9. The invention as set forth in claim 8 and wherein said fibers are oiled fibers.

10. A sponge rubber compound in accordance with claim 8, wherein said fibers are of vegetable origin.

11. A sponge rubber compound in accordance with claim 8, wherein said fibers are flocculent fibers of animal origin.

12. A sponge rubber compound in accordance with claim 8, wherein said fibers are composed of rayon.

FREDERICK J. MAYWALD.
FREDERICK J. MAYWALD, Jr.